United States Patent
Lynass et al.

(10) Patent No.: US 9,621,104 B2
(45) Date of Patent: Apr. 11, 2017

(54) METHOD AND APPARATUS FOR REGISTERING CONDITIONS OF PERFORMANCE IN A PHOTOVOLTAIC ARRAY

(71) Applicant: General Electric Company, Schenectady, NY (US)

(72) Inventors: Mark Ronald Lynass, Munich (DE); Said Farouk Said El-Barbari, Freising (DE); Lucian Vasile Stoica, Markt Nandlstadt (DE)

(73) Assignee: General Electric Company, Niskayuna, NY (US)

( * ) Notice: Subject to any disclaimer, the term of this patent is extended or adjusted under 35 U.S.C. 154(b) by 733 days.

(21) Appl. No.: 13/892,503

(22) Filed: May 13, 2013

(65) Prior Publication Data
US 2014/0333340 A1    Nov. 13, 2014

(51) Int. Cl.
*G01R 31/26* (2014.01)
*G01R 31/40* (2014.01)
*H02S 50/00* (2014.01)

(52) U.S. Cl.
CPC .................................. *H02S 50/00* (2013.01)

(58) Field of Classification Search
CPC ............................ G01R 31/2605; H02S 50/00
USPC .................................................... 324/761.01
See application file for complete search history.

(56) References Cited

U.S. PATENT DOCUMENTS

| | | | |
|---|---|---|---|
| 2008/0147335 A1* | 6/2008 | Adest | G01D 4/004 702/64 |
| 2011/0037600 A1 | 2/2011 | Takehara et al. | |
| 2011/0282601 A1* | 11/2011 | Hoff | G01W 1/12 702/60 |
| 2012/0056638 A1 | 3/2012 | Swahn | |
| 2012/0133208 A1 | 5/2012 | Kalhoff et al. | |
| 2012/0138123 A1* | 6/2012 | Newdoll | F24J 2/461 136/246 |
| 2012/0310427 A1* | 12/2012 | Williams | G05F 1/67 700/287 |
| 2013/0289904 A1* | 10/2013 | Marwah | G01D 4/00 702/61 |

OTHER PUBLICATIONS

RFID Tags, p. 1-3, http://wordinfo.info/unit/3994/ip:1/il:R, no date.*

* cited by examiner

*Primary Examiner* — Thomas Valone
(74) *Attorney, Agent, or Firm* — Ann M. Agosti

(57) ABSTRACT

Apparatus and method for registering conditions of performance in a photovoltaic array are provided. A group of neighboring photovoltaic modules may be arranged to sense a reference performance for a respective photovoltaic module of the photovoltaic array. Each of the neighboring photovoltaic modules may have a transmitter to transmit data indicative of the reference performance. The respective photovoltaic module may have a receiver to receive the data transmitted by the group of neighboring photovoltaic modules. A processor in the respective photovoltaic module may be provided to compare data indicative of its respective performance relative to the data received from the group of neighboring photovoltaic modules. The processor may be configured to register a condition of the performance of the respective photovoltaic module based on a result of the data comparison.

26 Claims, 3 Drawing Sheets

METHOD AND APPARATUS FOR REGISTERING CONDITIONS OF PERFORMANCE IN A PHOTOVOLTAIC ARRAY

FIELD OF THE INVENTION

The present invention is generally related to power generation, as may involve a photovoltaic array for generating electrical power, and, more particularly, to a method and apparatus for registering conditions of performance in the photovoltaic array.

BACKGROUND OF THE INVENTION

Large-scale generation of electric power based on a freely-available essentially inexhaustible natural resource, such as solar irradiance, continues progressing as an attractive modality for clean and efficient generation of electric power. A photovoltaic array may be typically made up of photovoltaic modules (e.g., solar panels), which may be electrically connected in series circuit to form strings connected to one or more inverters, which supply alternating current (AC) power to a power grid. Performance of the photovoltaic modules may degrade over time. For example, if the performance of a photovoltaic module degrades excessively, other modules that are connected in series circuit with the degraded module (e.g., in a string of modules) may end up providing suboptimal performance.

Therefore, one way to maximize energy yield would be to install monitoring devices to detect underperforming modules and subsequently replace such underperforming modules. Conventional technologies for monitoring individual PV modules often are centralized (e.g., involving a central data collection station) and consequently tend to be complex and economically costly. For example, use of wireless devices which may be used to communicate large amounts of data (e.g., from hundreds or even thousands of PV modules) to the central data collection station tend to be costly and complex to maintain. Techniques that involve irradiance sensors as a reference for monitoring performance of a PV module may be vulnerable to contamination of such sensors, such as due to dirt, etc.

In view of the foregoing considerations, it would be desirable to provide improved methodology and apparatus for registering conditions of performance in a photovoltaic array.

BRIEF DESCRIPTION OF THE INVENTION

Generally, in one non-limiting embodiment, a method for registering conditions of performance in a photovoltaic array comprising a plurality of photovoltaic modules is provided. The method may comprise sensing a reference performance for a respective photovoltaic module of the photovoltaic array during operation of a group of neighboring photovoltaic modules of the respective photovoltaic module. The group of neighboring photovoltaic modules may transmit data indicative of the reference performance, which data is received by the respective photovoltaic module. The respective photovoltaic module may compare data indicative of its performance relative to the data received from the group of neighboring photovoltaic modules, and based on a result of the comparing, the respective photovoltaic module may register a condition of its performance.

In another non-limiting embodiment, apparatus for registering conditions of performance in a photovoltaic array comprising a plurality of photovoltaic modules is provided. The apparatus may comprise a group of neighboring photovoltaic modules arranged to sense a reference performance for a respective photovoltaic module of the photovoltaic array. Each of the neighboring photovoltaic modules may have a transmitter to transmit data indicative of the reference performance. The respective photovoltaic module may have a receiver to receive the data transmitted by the group of neighboring photovoltaic modules. A processor in the respective photovoltaic module may compare data indicative of its respective performance relative to the data received from the group of neighboring photovoltaic modules. The processor may be configured to register a condition of the performance of the respective photovoltaic module based on a result of the data comparison.

In yet another non-limiting embodiment, a method for registering conditions of performance in a photovoltaic array comprising a plurality of strings of photovoltaic modules that may be connected in series circuit is provided. The method may comprise sensing a reference performance for a respective string of the photovoltaic array during operation of a group of neighboring strings. The group of neighboring strings may transmit data indicative of the reference performance which data is received by the respective string. The respective string may compare data indicative of its performance relative to the data received from the group of neighboring strings, and based on a result of the comparing, the respective string may register a condition of its performance.

BRIEF DESCRIPTION OF THE DRAWINGS

The invention is explained in the following description in view of the drawings that show.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent.

As used herein, the term "module" (or "circuitry") may refer to software, hardware, firmware, or any combination of these, or any system, process, structure or functionality that may perform or facilitate the processes described herein. Repeated usage of the phrase "in one embodiment" does not necessarily refer to the same embodiment, although it may. Lastly, the terms "comprising", "including", "having", and the like, as used in the present application, are intended to be synonymous unless otherwise indicated.

Aspects of the present invention are directed to a method and apparatus for registering conditions in a photovoltaic array, as may be made up of a plurality of photovoltaic modules. Non-limiting examples of performance conditions, which may be assessed by a method and apparatus embodying aspects of the present invention may include 1) assessing conditions of operational performance of the photovoltaic array; 2) assessing other conditions, which may affect performance of the photovoltaic array but may not be necessarily driven by the internal running of components of the array, such as would be the case in the event the sub-performance of one or more of photovoltaic modules of the array is caused due to localized solar irradiance shading (e.g., shading due to structures (e.g., buildings, trees, etc.) located proximate to the one or more photovoltaic modules). The inventors of the present invention have innovatively recognized that use of "neighboring" photovoltaic modules may be effectively used to assess conditions of performance of each individual photovoltaic module of the array without involvement of a central station and/or concomitant involvement of costly communication equipment.

Figure 1:
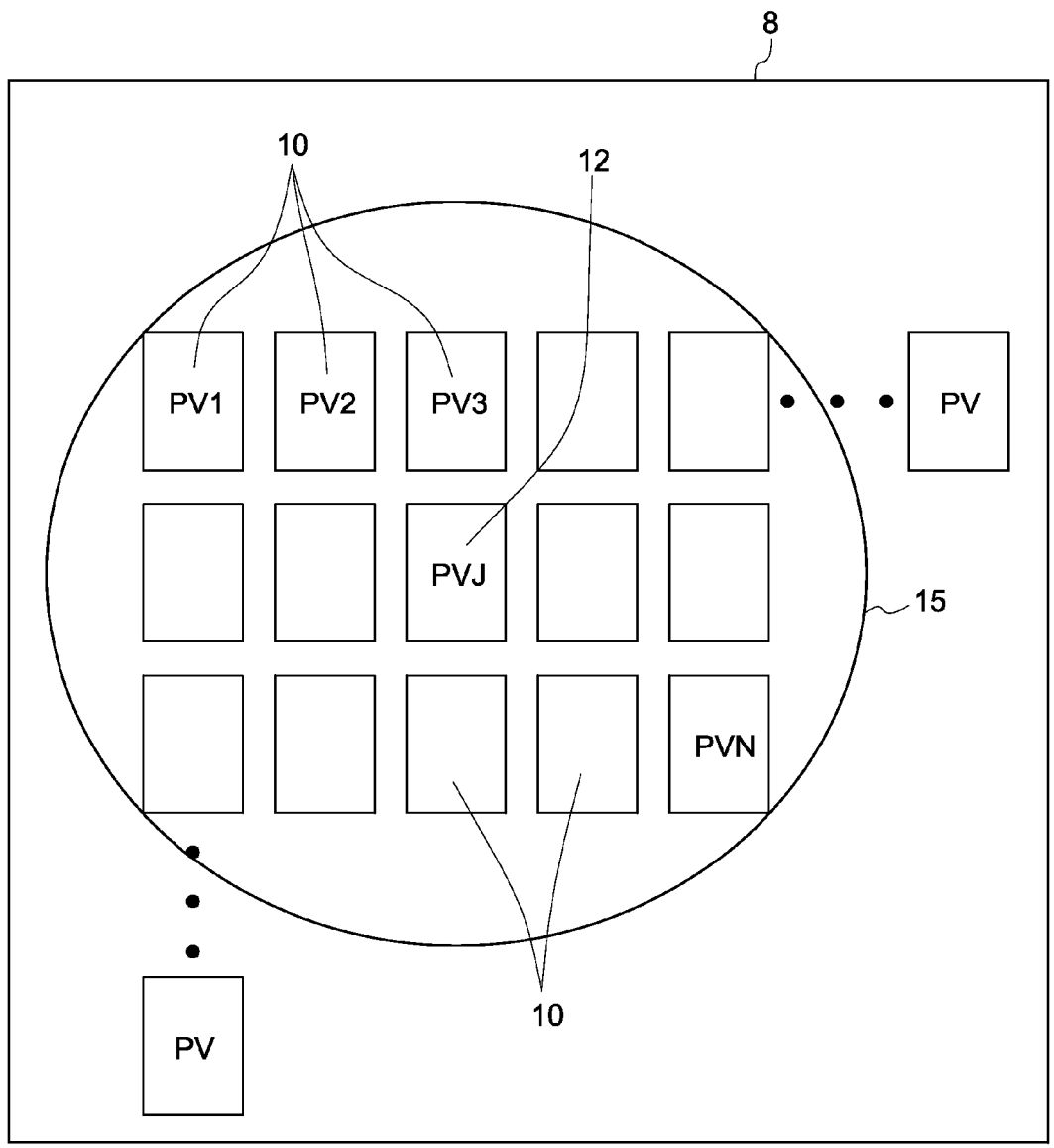
FIG. 1 is a schematic representation of a photovoltaic array illustrating an example group of neighboring photovoltaic modules, as may be arranged to sense a reference performance for a respective photovoltaic module of the photovoltaic array.

FIG. 1 is a schematic representation of a photovoltaic array 8 illustrating one example group of neighboring photovoltaic modules 10 (labeled PV1, PV2, PV3 ... PVN) as may be arranged to sense a reference performance for a respective photovoltaic module 12 (labeled PVJ) of the photovoltaic array. For the sake of simplicity of explanation, the description below focuses on interrelationships for one example group of neighboring photovoltaic modules 10 relative to photovoltaic module 12. It will be appreciated, however, that performance conditions in each of the modules of photovoltaic array 8 may be registered in accordance with aspects of the present invention by way of comparison with other neighboring photovoltaic modules, which would be conceptually and functionally analogous to the illustrated example group of neighboring photovoltaic modules. The idea is that groups of neighboring photovoltaic modules can be replicated throughout an entire photovoltaic array to evaluate performance conditions of each photovoltaic module of the array in a decentralized manner as well as a cost-effective and reliable manner.

As will be appreciated from the description below, "neighboring" photovoltaic modules refers to photovoltaic modules that may be located proximate to one another. In one non-limiting example embodiment, such neighboring photovoltaic modules may be equipped with a relatively low-cost, low-power transceiver (e.g., receiver and transmitter integrated as one device or separate devices) and may be located in the transmission/reception range of the transceivers (e.g., from a few meters to several tens of meters).

For example, circle 15 in FIG. 1 may represent an example transmission/reception range where fourteen example "neighboring" photovoltaic modules 10 may be arranged relative to photovoltaic module 12. It will be appreciated that the shape of transmission/reception range need not be circular and that the number of neighboring photovoltaic modules per group, or the number of neighboring groups that may be involved for an entire array is not limited to any specific number.

Conceptually, the number of neighboring photovoltaic modules in any given group should be sufficiently high to provide robust statistics in connection with the data conveyed by the group (e.g., reference performance). Conversely, the number of neighboring photovoltaic modules in any given group should be sufficiently low so that data conveyed by any given group can be reliably transmitted by relatively low-cost, low-power communication equipment. Although the description below discloses example embodiments as may be directed to a wireless communication modality—e.g., a short-range, low-power radio frequency communication that may be used by the neighboring photovoltaic modules to share their data with other neighboring photovoltaic modules—it will be appreciated that aspects of the present invention are not limited to any specific communication/connection modality. For example, it is contemplated that other communication/connection modalities, such as may involve wired connections, optical fiber connections, acoustic communication, optical communication, etc., may be used by the neighboring photovoltaic modules to share their data with other neighboring photovoltaic modules.

Figure 2:
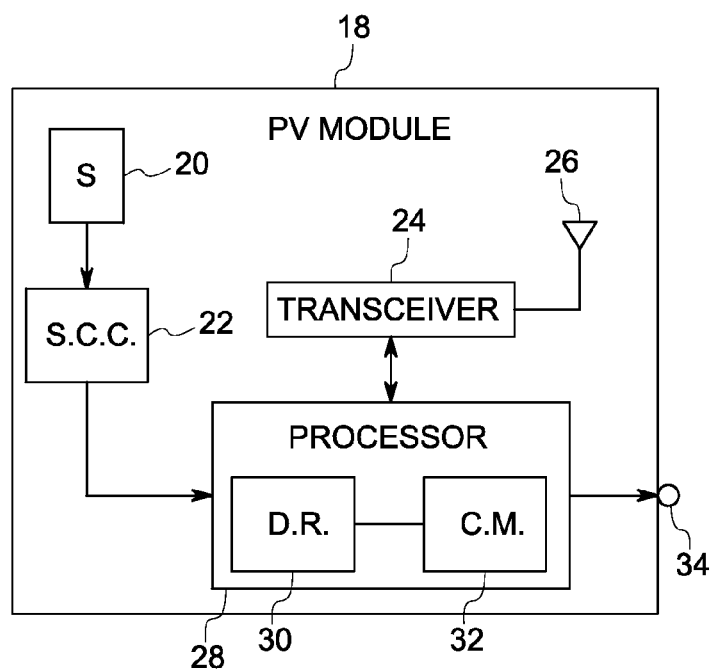
FIG. 2 is a block diagram of an example embodiment of an apparatus that may be used by photovoltaic modules embodying aspects of the present invention for registering one or more conditions of performance in a photovoltaic array by way of comparison with neighboring photovoltaic modules.

FIG. 2 is a block diagram of a non-limiting embodiment of an apparatus that may be used by a photovoltaic module 18 (e.g., each of the photovoltaic modules in photovoltaic array 8 in FIG. 1) embodying aspects of the present invention. One or more sensors 20 (labeled S) may be coupled to sense at least one operational parameter in photovoltaic module 18, such as a current parameter, a voltage parameter, a temperature parameter, a combination of at least two of the foregoing parameters. In one non-limiting embodiment, sensors 20 may comprise sensor tags, as may be fabricated on a thin, flexible film substrate which may be affixed onto a PV module, to sense operational parameters in the photovoltaic module, such as voltage and current, without physically interfacing with the wiring of the module (e.g., by way of inductive-coupling). Thus, this embodiment would simplify interfacing an apparatus embodying aspects of the present invention with a field-deployed photovoltaic module.

A signal conditioning circuitry 22 (labeled S.C.C.) may be used to appropriately condition (e.g., perform analog-to-digital conversion) a signal indicative of the parameter sensed by sensor 20. A transceiver 24 and antenna 26 may be used to receive data (e.g., the reference performance) from neighboring photovoltaic modules (e.g., photovoltaic modules 10 in FIGS. 1 and 3); or to transmit data from photovoltaic module 18 to other neighboring modules. It will be appreciated that any of various short-range, low-power technologies may be used by transceiver 24. Example short-range, low-power technologies which may be used may be IEEE 802.15.4 standard, ISM bands, ANT and ANT+ protocol, Bluetooth wireless technology, etc. The foregoing should be construed as illustrative examples of short-range, low-power technologies and should not be construed in a limiting sense since other short-range, low-power technologies may be employed. It will be appreciated that the receiver and transmitter structure provided by transceiver 24 need not be integrated into one device since such structure may be provided by way of separate devices.

Figure 3:
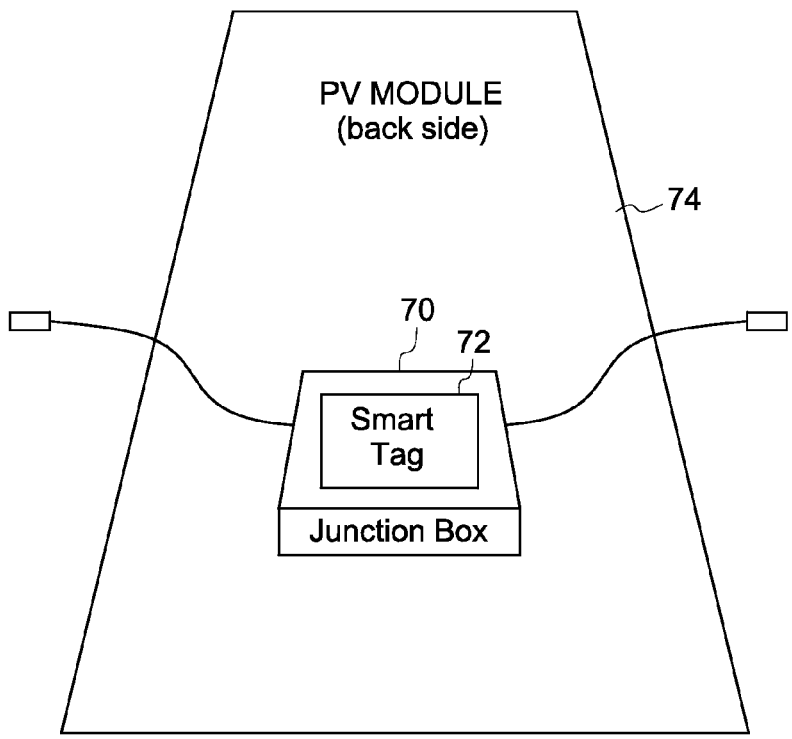
FIG. 3 is a schematic representation of another example embodiment of an apparatus, which in accordance with further aspects of the invention may be made up of a smart tag and which may be conveniently attached onto a photovoltaic module.

In one example embodiment, each photovoltaic module 18 may further include a processor 28, which may include a data reduction module 30 (labeled D.R.) to reduce the data (e.g., the reference performance) transmitted by the neighboring photovoltaic modules (e.g., photovoltaic modules 10 in FIGS. 1 and 3). For example, data reduction module 30 may be configured to calculate a statistical measurement, such as a mean value and a standard deviation value of the data transmitted by the neighboring photovoltaic modules. For example, if the operational parameter being evaluated is a voltage parameter of the PV module, then the reduced data may be a mean value and a standard deviation of the respective values of the voltage parameter transmitted by the group of fourteen neighboring photovoltaic modules 10. In one example embodiment, the standard deviation may be used to estimate whether the operational parameter (e.g., voltage parameter) may have been sensed during rapidly changing operational conditions (e.g., dynamically changing irradiance due to clouds intermittently obscuring the neighboring photovoltaic modules) as opposed to relatively steady-state operational conditions (e.g., relatively steady irradiance under a clear day or under steady cloud conditions). In one non-limiting embodiment, time-of-day statistics may be used to detect time-of-day patterns that may be indicative of certain conditions of performance. Thus, performance conditions of the photovoltaic modules may be evaluated during specific time periods of the day so that, for example, one may choose to evaluate the photovoltaic modules during periods of relatively low solar irradiance (such as during early morning or late afternoon). This may allow establishing time-of-day (e.g., hourly) patterns that may be conducive to screening out photovoltaic modules that may perform well during periods of relatively high solar irradiance but that may not perform well during periods of relatively low solar irradiance. In general, data reduction module 30 may be configured to calculate a statistical indicator in connection with the data transmitted by the neighboring photovoltaic modules. Non-limiting examples of statistical indicators may be a mean value, a standard deviation value, time-of-day patterns, a degree of steadiness of solar irradiance, etc.

A comparison module 32 (labeled C.M.) may be configured to compare the value of the operational parameter sensed by photovoltaic module 18 (e.g., photovoltaic module 12 in FIGS. 1 and 3) relative to the reduced data. For example, if the value of the voltage parameter of photovoltaic module 12 is outside a predefined range relative to the mean value of the voltage parameter obtained from neighboring photovoltaic modules 10, then an indicator 34 (such as one or more light emitting diodes (L.E.D.) or other suitable indicator as may be physically attached to photovoltaic module 18) may be triggered to indicate a registered condition of the operational performance of photovoltaic module 18. In one example embodiment, a respective digital code (from a plurality of digital codes) may be transmitted by transceiver 24 to appropriately indicate the registered condition (e.g., deficient voltage parameter value, excessive heat generation, etc.,) regarding the performance of photovoltaic module 18. It will be appreciated by those skilled in the art that an advantageous attribute of the foregoing apparatus is based on its straightforward circuitry and functionality, which is conducive to lower manufacturing costs and may thus provide a cost-effective and reliable solution to register conditions of performance of each individual photovoltaic module of the array without involvement of a central station and/or involvement of costly communication equipment.

In one non-limiting embodiment, electrical power to energize an apparatus embodying aspects of the present invention (e.g., sensors, processing and communication circuitry) may be obtained (e.g., harvested) from photovoltaic module 18 and thus such an embodiment need not be implemented with batteries. The architecture of an apparatus embodying aspects of the present invention may take various forms depending on the needs of a given application and/or economic considerations. Non limiting example architectures may be an Application-Specific Integrated Circuit (ASIC), a Field Programmable Gate Array (FPGA), smart tag, printed circuit board (PCB), Radio-frequency Identification (RFID), etc.

It is contemplated that an apparatus embodying aspects of the present invention may be retrofitted in field-deployed photovoltaic modules. For example, as may be appreciated in FIG. 3, such apparatus may be implemented using smart tag technology. That is, the sensors, processing and communication circuitry may be integrated in a smart tag 72, which in one non-limiting embodiment may be physically attached as a sticker or label to a junction box 70 of the photovoltaic module, or may be attached at a location on a back panel 74 of the photovoltaic module. In another example embodiment, an apparatus embodying aspects of the present invention may be integrated as part of newly-manufactured photovoltaic modules.

Figure 4:
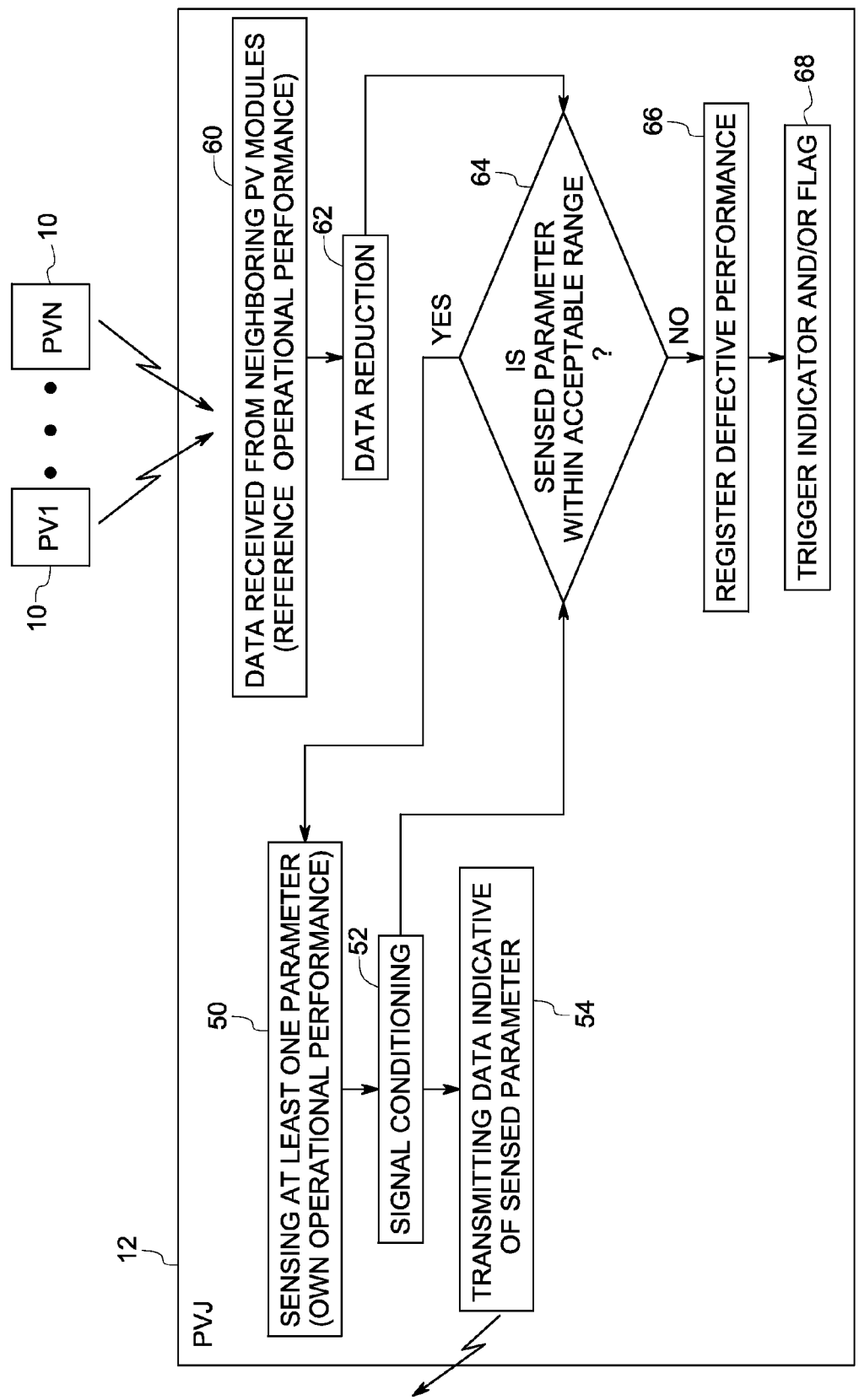
FIG. 4 is an illustration of an example data flow as may be performed in accordance with aspects of the present invention for registering conditions of performance in a photovoltaic array by way of comparison with neighboring photovoltaic modules.

FIG. 4 is an example data flow as may be performed in accordance with aspects of the present invention for registering conditions of performance in a photovoltaic array by way of comparison with neighboring photovoltaic modules. In one example embodiment, block 50 allows sensing in photovoltaic module 12 at least one operational parameter, such as a current parameter, a voltage parameter, a temperature parameter, a combination of at least two of the foregoing parameters. Block 52 allows performing appropriate signal conditioning (e.g., perform analog-to-digital conversion, data reduction, such as calculating a mean value and a standard deviation) of the sensed parameter. Block 54 allows transmitting data indicative of the sensed parameter to other neighboring photovoltaic modules. That is, photovoltaic module 12 (as any of the photovoltaic modules of the photovoltaic array) normally contributes to establish the reference operational performance with respect to other neighboring modules.

Block 60 allows receiving data from neighboring photovoltaic modules 10. This allows sensing a reference performance for respective photovoltaic module 12 during operation of neighboring photovoltaic modules 10. Block 62 allows performing a data reduction of the data transmitted by neighboring photovoltaic modules 10. In one example embodiment, this may allow calculating a statistical measurement, such as a mean value and a standard deviation of the data transmitted by neighboring photovoltaic modules 10.

Decision block 64 allows deciding whether the value of the operational parameter sensed by photovoltaic module 12 is acceptable relative to the reduced data. If a present value of the operational parameter sensed by photovoltaic module 12 is acceptable then a further iteration of the parameter sensing action may continue at block 50. Conversely, if the present value of the operational parameter sensed by photovoltaic module 12 is not acceptable relative to the reduced data, then block 66 allows registering a condition of the performance of photovoltaic module 12. For example, if the value of the voltage parameter of photovoltaic module 12 is outside a predefined range relative to the mean value of the voltage parameter obtained from neighboring photovoltaic modules 10, then block 68 allows triggering (e.g., turning on) a suitable indicator as may be physically attached to photovoltaic module 12 to indicate a registered condition (e.g., a defective condition, or sub-performance due to external factors (e.g., due to shading structures)) of the performance of photovoltaic module 12. In one example embodiment, a respective digital code (from a plurality of digital codes) may be transmitted to appropriately indicate the registered condition (e.g., deficient voltage parameter, excessive heat generation, etc.,) regarding the performance of photovoltaic module 12.

It will be appreciated that disclosed embodiments for registering conditions of performance in a photovoltaic array by way of comparison with operating neighboring photovoltaic modules can provide substantial operational flexibility. For example, performance of the photovoltaic module may be conveniently evaluated at any time of the day so that, for example, one may choose to evaluate the photovoltaic modules during periods of relatively low solar irradiance (such as during early morning or late afternoon). This may allow screening out photovoltaic modules that may perform well during periods of relatively high solar irradiance but that may not perform well during periods of relatively low solar irradiance. Conceptually, each of the neighboring photovoltaic modules may be analogized to a perennially ready and freely available, calibrated reference for evaluating performance in a photovoltaic array without having to use any dedicated testing equipment, such as may involve an external irradiance source, and/or without having to schedule for availability or without having to perform calibration of such external irradiance source, etc.

Although the foregoing description has focused on neighboring photovoltaic modules, it will be appreciated that the concept of registering conditions of performance in the photovoltaic array may be conceptually extended to any degree of granularity that may be desired, such as neighboring strings, etc. For example, it is contemplated that performance conditions of strings of photovoltaic modules connected in series-circuit may be registered in accordance with aspects of the present invention by way of comparison with neighboring strings. For example, one may sense with an apparatus embodying aspects of the present invention a current parameter in a respective photovoltaic module of a given string (not necessarily in each photovoltaic module of the string) and this sensing, together with comparison to reference performance from neighboring strings, may allow registering performance conditions for the given string. As suggested above, it will be appreciated that the granularity of neighboring concepts for registering conditions of performance in the photovoltaic array need not be limited to neighboring photovoltaic modules or neighboring strings. For example, such neighboring granularity could be expanded from a photovoltaic cell level (e.g., neighboring cells) in a given photovoltaic module to combinations of strings (e.g., neighboring combinations of strings) or even higher levels of associative neighboring paradigms for registering conditions of performance in the photovoltaic array.

In another example application of an apparatus embodying aspects of the present invention, it is contemplated that under-performing photovoltaic modules (e.g., mismatched photovoltaic modules) may be advantageously detected in a string of photovoltaic modules where each photovoltaic module may be equipped with a respective apparatus embodying aspects of the present invention. This detection is advantageous since, as will be appreciated by those skilled in the art, when photovoltaic modules are connected in series circuit, then the performance of the entire string could be limited by the deficient capability (e.g., deficient current capability) of even a single under-performing photovoltaic module in the string. For example, in this case a registered condition in the under-performing photovoltaic module may be a relatively higher voltage drop and/or relatively higher temperature, which once detected would allow electrically bypassing or replacing the under-performing photovoltaic module to regain appropriate performance in the given string of photovoltaic modules.

It will be appreciated that aspects of an example inventive apparatus—as may be used to register conditions of performance in a photovoltaic array by way of comparison with neighboring photovoltaic modules—and methods disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc.), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. An interface display may be a tablet, flat panel display, PDA, or the like.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
   in a photovoltaic array comprising a plurality of groups of neighboring photovoltaic modules, sensing, by using at least one sensor, a reference performance for a respective photovoltaic module of a respective group of neighboring photovoltaic modules in the photovoltaic array during operation of the respective group of neighboring photovoltaic modules;
   receiving data indicative of reference performances of the respective group of neighboring photovoltaic modules from transmitters of the respective group of neighboring photovoltaic modules;
   the respective photovoltaic module comparing, using a processor of the respective photovoltaic module without involvement of a central station, data indicative of its performance relative to the data received from the group of neighboring photovoltaic modules; and
   based on a result of said comparing, said respective photovoltaic module registering a condition of its performance using the processor, wherein registering the condition of its performance comprises triggering an indicator, transmitting a digital code, or both; and replacing or electrically bypassing said respective photovoltaic module based on the registered condition of its performance by said respective photovoltaic module.

2. The method of claim 1, wherein the sensing of the reference performance comprises sensing at least one operational parameter in the neighboring photovoltaic modules.

3. The method of claim 2, further comprising sensing said at least one operational parameter in the respective photovoltaic module to obtain the data indicative of the performance of the respective photovoltaic module.

4. The method of claim 3, wherein said at least one operational parameter is selected from the group consisting of a current parameter, a voltage parameter, a temperature parameter and a combination of at least two of said parameters.

5. The method of claim 1, wherein the respective photovoltaic module belongs to a group of neighboring photovoltaic modules of at least another photovoltaic module of the photovoltaic array, and contributes to establish a reference performance for said at least another photovoltaic module by transmitting, by a transmitter of the respective photovoltaic module, the data indicative of its respective performance to said at least another photovoltaic module.

6. The method of claim 1, further comprising transmitting, by a transmitter of the respective photovoltaic module, data indicative of the reference performance to other photovoltaic modules in the group of neighboring photovoltaic modules, wherein the transmitting of data is selected from the group consisting of wireless transmitting, wired transmitting, optical transmitting, and acoustic transmitting.

7. The method of claim 6, wherein the group of neighboring photovoltaic modules is defined based on a transmission range for the transmitting.

8. The method of claim 1, further comprising performing, by the processor, a data reduction of the data transmitted by the neighboring photovoltaic modules.

9. The method of claim 8, wherein performing the data reduction comprises calculating a statistical indicator in connection with the data received from the neighboring photovoltaic modules, wherein the statistical indicator is selected from the group consisting of a mean value, a standard deviation value, time-of-day patterns, a degree of steadiness of solar irradiance.

10. The method of claim 8, wherein the comparing by the processor comprises comparing the data indicative of its respective performance relative to the reduced data.

11. The method of claim 1, further comprising sensing a reference performance for a further photovoltaic module of the photovoltaic array based on a further group of neighboring photovoltaic modules of the further photovoltaic module, the further group of neighboring photovoltaic modules transmitting data indicative of the reference performance to be received by the further photovoltaic module, said further photovoltaic module comparing data indicative of its performance relative to the data received from the further group of neighboring photovoltaic modules, and based on a result of said comparing, said further photovoltaic module registering a condition of its performance.

12. The method of claim 11, wherein each photovoltaic module of the photovoltaic array is configured to register a condition of its performance based on a result of a comparison of its performance relative to a reference performance sensed by a respective group of neighboring photovoltaic modules of each photovoltaic module.

13. Apparatus for registering conditions of performance in a photovoltaic array comprising a plurality of photovoltaic modules, the apparatus comprising:

a plurality of groups of neighboring photovoltaic modules, each of the neighboring photovoltaic modules of a respective group of neighboring photovoltaic modules arranged to sense a reference performance for the respective photovoltaic module;

each of the neighboring photovoltaic modules having a transmitter to transmit data indicative of the reference performance to others of the neighboring photovoltaic modules of the respective group of neighboring photovoltaic modules;

each of the neighboring photovoltaic modules having a receiver to receive the data transmitted by the others of the neighboring photovoltaic modules of the respective group of neighboring photovoltaic modules; and each of the neighboring photovoltaic modules having a processor in said respective photovoltaic module to compare data indicative of its respective performance relative to the data received from the respective group of neighboring photovoltaic modules without involvement of a central station, the processor configured to register a condition of the performance of the respective photovoltaic module based on a result of the data comparison by triggering an indicator, transmitting a digital code, or both, the processor further configured for bypassing the respective photovoltaic module, commanding a replacement of the respective photovoltaic module, or both, based on the registered condition.

14. The apparatus of claim 13, wherein each of the neighboring photovoltaic modules of the respective group of neighboring photovoltaic modules comprises at least one sensor to sense at least one operational parameter in the respective photovoltaic module.

15. The apparatus of claim 14, wherein said at least one operational parameter is selected from the group consisting of a current parameter, a voltage parameter, a temperature parameter and a combination of at least two of said parameters.

16. The apparatus of claim 13, wherein the respective photovoltaic module belongs to at least one group of neighboring photovoltaic modules of at least another photovoltaic module and normally contributes to establish a reference performance for said at least another photovoltaic module of the photovoltaic array, wherein the respective photovoltaic module further comprises a transmitter to transmit the data indicative of its respective performance to said at least another photovoltaic module.

17. The apparatus of claim 13, wherein the transmitter and receiver are selected from the group consisting of wireless transmitter and receiver, wired transmitter and receiver, optical transmitter and receiver, and acoustic transmitter and receiver.

18. The apparatus of claim 17, wherein the group of neighboring photovoltaic modules is defined based on a transmission range of the transmitter.

19. The apparatus of claim 13, wherein the processor comprises a data reduction module to reduce the data transmitted by the neighboring photovoltaic modules.

20. The apparatus of claim 18, wherein the data reduction module is configured to calculate a statistical indicator in connection with the data transmitted by the neighboring photovoltaic modules, wherein the statistical indicator is selected from the group consisting of a mean value, a standard deviation value, time-of-day patterns, and a degree of steadiness of solar irradiance.

21. The apparatus of claim 18, wherein the processor comprises a comparison module configured to compare the data indicative of the performance of the respective photovoltaic module relative to the reduced data.

22. The apparatus of claim 13, further comprising an indicator indicative of a registered condition of the performance.

23. The apparatus of claim 22, wherein the indicator comprises an indicator selected from the group consisting of an indicator device physically attached to the respective photovoltaic module, a digital code transmitted by a transmitter of the respective photovoltaic module, or both.

24. The apparatus of claim 13, wherein an architecture for the processor, transmitter, receiver and said at least one sensor is selected from the group consisting of an Application-Specific Integrated Circuit (ASIC) architecture, a Field Programmable Gate Array (FPGA) architecture, a smart tag, a printed circuit board architecture and a Radio-frequency Identification (RFID) architecture.

25. The apparatus of claim 13, wherein an architecture for the processor, transmitter, receiver and said at least one sensor comprises a smart tag affixed onto a respective junction box or a back panel of a photovoltaic module.

26. A method comprising:
in a photovoltaic array comprising a plurality of groups of neighboring strings of photovoltaic modules, sensing, by using at least one sensor, a reference performance for a respective string of a respective group of neighboring strings during operation of the respective group of neighboring strings;
receiving data indicative of reference performances of the respective group of neighboring strings from transmitters of the respective group of neighboring strings;
the respective string comparing, using a processor of the respective string without involvement of a central station, data indicative of its performance relative to the data received from the group of neighboring strings; and
based on a result of said comparing, said respective string registering a condition of its performance using the processor, wherein registering the condition of its performance comprises triggering an indicator, transmitting a digital code, or both; and
replacing or electrically bypassing said respective string based on the registered condition of its performance by said respective photovoltaic string.

* * * * *